(12) United States Patent
Hill et al.

(10) Patent No.: US 8,940,121 B2
(45) Date of Patent: Jan. 27, 2015

(54) METHOD FOR MANUFACTURING A STORAGE TANK

(75) Inventors: David Hill, Commerce Township, MI (US); James Edward Thompson, Novi, MI (US)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 12/997,368

(22) PCT Filed: Jun. 24, 2009

(86) PCT No.: PCT/EP2009/057903
§ 371 (c)(1),
(2), (4) Date: Dec. 10, 2010

(87) PCT Pub. No.: WO2009/156442
PCT Pub. Date: Dec. 30, 2009

(65) Prior Publication Data
US 2011/0094658 A1    Apr. 28, 2011

Related U.S. Application Data

(60) Provisional application No. 61/075,433, filed on Jun. 25, 2008.

(51) Int. Cl.
*B29C 70/86* (2006.01)
*B29C 49/04* (2006.01)
*B29C 53/60* (2006.01)
*B29C 63/24* (2006.01)
*B29L 31/00* (2006.01)

(52) U.S. Cl.
CPC ............... *B29C 49/04* (2013.01); *B29C 53/602* (2013.01); *B29C 63/24* (2013.01); *B29C 2791/001* (2013.01); *B29L 2031/7156* (2013.01); *F17C 2205/0305* (2013.01)
USPC ........................................... 156/245; 156/172

(58) Field of Classification Search
CPC  B29C 2791/001; B29C 49/04; B29C 53/602; B29C 63/24; B29L 2031/7156
USPC ........................................................ 156/245
See application file for complete search history.

(56) References Cited

U.S. PATENT DOCUMENTS 3,874,544 A    4/1975  Harmon
4,155,696 A *  5/1979  Siard et al. .................... 425/522
(Continued)

FOREIGN PATENT DOCUMENTS

EP    0874187 A1    10/1998
EP    1850058 A1    10/2007
(Continued)

*Primary Examiner* — Philip Tucker
*Assistant Examiner* — Vicki Wu
(74) *Attorney, Agent, or Firm* — Oblon, Spivak, McClelland, Maier & Neustadt, L.L.P.

(57) ABSTRACT

Method for manufacturing a storage tank comprising an inner liner, an outer filament winding and a connecting part. The method comprises the steps of: blow molding the inner liner by extruding a parison, pinching the inner liner at least at one extremity to create a pinch and then blowing the parison; providing the connecting part with a slot of appropriate shape and size to receive a part of the pinch; inserting the part of the pinch in the slot so as to secure the inner liner and the connecting part; and applying the outer filament winding around the liner and the connecting part.

18 Claims, 2 Drawing Sheets

(56) References Cited

U.S. PATENT DOCUMENTS

| | | | |
|---|---|---|---|
| 4,155,794 A * | 5/1979 | Raabe et al. | 156/380.2 |
| 4,360,116 A * | 11/1982 | Humphrey | 220/586 |
| 4,589,563 A | 5/1986 | Born | |
| 4,705,468 A * | 11/1987 | LeBreton | 425/116 |
| 5,429,845 A | 7/1995 | Newhouse et al. | |
| 5,458,258 A * | 10/1995 | White et al. | 220/589 |
| 5,464,635 A * | 11/1995 | Geiger | 425/532 |
| 5,538,680 A * | 7/1996 | Enders | 264/516 |
| 5,568,878 A | 10/1996 | LeBreton | |
| 5,819,978 A * | 10/1998 | Hlebovy | 220/601 |
| 6,063,223 A * | 5/2000 | Klauke et al. | 156/242 |
| 6,866,812 B2 * | 3/2005 | Van Schaftingen et al. | 264/515 |
| 2005/0260372 A1 | 11/2005 | Matsuoka et al. | |
| 2005/0260373 A1 * | 11/2005 | DeLay et al. | 428/36.4 |
| 2009/0022918 A1 * | 1/2009 | Matsuoka et al. | 428/35.7 |

FOREIGN PATENT DOCUMENTS

| | | |
|---|---|---|
| JP | 58-220738 | 12/1983 |
| JP | 5-185529 | 7/1993 |
| JP | 9242990 A | 9/1997 |
| JP | 2005-246671 | 9/2005 |
| JP | 20060161978 A | 6/2006 |
| WO | WO 9600142 A1 | 1/1996 |
| WO | WO 9834064 A1 | 8/1998 |
| WO | WO 2007/086336 A1 | 8/2007 |

* cited by examiner

METHOD FOR MANUFACTURING A STORAGE TANK

CROSS-REFERENCE TO RELATED APPLICATIONS

This application is a U.S. national stage application under 35 U.S.C. §371 of International Application No. PCT/EP2009/057903 filed Jun. 24, 2009, which claims priority to U.S. Provisional Patent Application No. 61/075,433 filed Jun. 25, 2008, the whole content of this application being incorporated herein by reference for all purposes.

TECHNICAL FIELD OF THE INVENTION

The present invention relates to a method for manufacturing a storage tank, in particular a hydrogen storage tank.

BACKGROUND OF THE INVENTION

Compressed gas is becoming an increasingly popular choice for transportation of fuels. As more and more vehicles use compressed gas as fuel, more emphasis needs to be put on the emissions of the fuel systems of such vehicles. Currently, there is a requirement from compressed gas fuel systems that addresses the safety risks of gas permeation from such a system. There is, however, currently no standard that addresses the environmental concerns of compressed gas permeation. When such a standard is introduced, it is likely to be much more restrictive than the current emissions standard.

The vast majority of the compressed gas tanks used on transportation vehicles today is designed to store compressed methane gas ($CH_4$) and is of type III or type IV. There is however, for environmental reasons, a desire to move to compressed hydrogen ($H_2$) as fuel. There are currently no production vehicles being fueled by compressed hydrogen.

Because of the larger molecule size of methane, compared to hydrogen, conventional type II, III and IV tanks meet the current permeation requirements when filled with compressed methane gas. For compressed hydrogen, these conventional tanks do however not necessarily meet the requirements, especially if, as expected, more restrictive requirements are introduced.

Storage tanks have been classified in different categories. Type II tanks concern all steel tanks, which are generally rather heavy and therefore not favored in relation with vehicles. Type III tanks are composite tanks with aluminum liners. These tanks show excellent emission results but are rather expensive. Type IV tanks are composite tanks with polymer liners. Type IV tanks also have very good emission results but, compared to the type III tanks, these tanks have the further advantage of being lighter and less expensive. Therefore, type IV tanks are the most likely candidates for compressed hydrogen storage tanks.

One example of a type IV storage tank is shown in WO 07/110399 in the name of the Applicant, which teaches a method for manufacturing a pressure vessel having an outer reinforcing layer (outer shell) and an inner liner comprising hemispherical end caps butt welded on a cylindrical body. The conventional blow molding technique, which is well known in the field of regular fuel tanks, can be used for making the cylindrical body. However, a pinch is created at least at one extremity of the liner and is then removed to create a cylindrical body with an open end. The removal step of the pinch and the welding of the end cap imply an increase of the manufacturing time and wasting of material. Consequently such manufacturing method has the disadvantage of not promoting high volume production.

Additionally, the pinch that may result from the compression of extremities of the parison has to resist to high pressure values, in particular in applications for pressure vessels. Under the effect of internal pressure on the pinch, this latter may separate and a leak may result in the pressure vessel.

SUMMARY

The present invention aims at avoiding the cited drawbacks and provides a method resulting in a gain of material and time, and additionally solving the problem of reinforcing the pinch of the pressure vessel by creating a tank liner and an end cap in a type IV tank in separate processes and connecting the two securely. The risk of pinch separation is greatly reduced with the solution provided by the invention because the pinch is constrained. The resulting connection acts as a mechanical lock between the two components, suitable for withstanding the forces associated with the process of filament winding.

Furthermore, the inner liner according to an embodiment of the present method provides excellent permeation qualities and is suitable in connection with storage tanks for compressed hydrogen.

Accordingly, the present invention concerns a method for manufacturing a storage tank comprising an inner liner, an outer filament winding and a connecting part, said method comprising the steps of:

blow molding the liner by extruding a parison, pinching the parison at least at one extremity and then blowing it;
providing the connecting part with a slot of appropriate shape and size to receive a part of the pinch;
inserting said part of the pinch in said slot so as to secure the liner and the connecting part; and
applying the outer filament winding around the liner and the connecting part.

BRIEF DESCRIPTION OF THE DRAWINGS

For a detailed description of the invention, reference will now be made to the accompanying drawings in which.

DETAILED DESCRIPTION OF PREFERRED EMBODIMENTS

Figure 1:
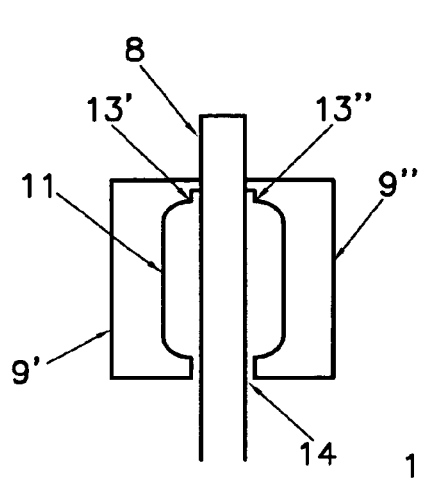
FIG. 1 is a view of a parison inserted in a mold in an open position.

With the method according to the invention, an inner liner with good emission results can be more cost-effectively produced. It is not necessary to use a complex injection molding process to produce the entire inner liner or even the end caps as taught in WO '399. In the context of the invention, the method provides steps of manufacturing a cylindrical body from an extruded parison of closed cross section that is formed by molding.

The parison undergoes a forming operation by blow molding, that is to say inserting it between at least two halves of a mold and then closing these halves and blowing a pressured gas so as to press the parison against the internal surface of the mold at a predetermined temperature for a predetermined time.

Preferably, the method comprises the steps of pinching the parison at a first extremity, around a blowing needle and at a second extremity, between the at least two mold halves.

Preferably also, the internal surface of the two mold halves has a specific shape so as to create a cylindrical housing having the shape of the liner and in particular a pinch of appropriate shape and size at the second extremity.

More preferably the method comprises the steps of pinching the parison together at the top of the mold where the housing comprises an extension and the steps of inserting the blowing needle in the housing at the bottom of the mold which seals around it so that the internal part of the mold is sealed during the molding of the liner.

Generally the diameter of the extruded parison is bigger than the diameter of the extension of the housing because of the limitation in the stretching of the polymer during the blow molding process. Hence the pinch has generally a part at the end of the extension of the housing and a part that is inserted in a slot of the connecting part in the method according to the invention.

The pinch at the top of the mold is preferentially intentionally created by the two mold halves during the manufacturing process of the cylindrical body. The shape of the pinch can also be created after the blow molding of the parison, for example by machining the pinch. Examples of shape of the pinch are an inverted cone, a T-shape boss, a stud or a pinch with a snap fit shape as commonly used in the plastics industry.

According to the invention, the connecting part is secured to the liner before applying the outer filament winding around the liner and the connecting part. The connecting part is in general at least partially made of a metal.

The connecting part comprises an extension of tubular shape that matches the extension of the housing and corresponds to a communication boss. The ends of both tubular extensions are open so that a communication passage between the interior of the storage tank and the exterior thereof is created. Therefore, the open end of the extension of the housing is machined after the cylindrical body has been manufactured so that part of the pinch is removed as well.

According to the invention, a slot is provided (by machining, molding, ...) in the connecting part. This slot is generally created with a T-slot mill or a dovetail type mill during a machining process. The slot has preferably a shape that corresponds to the shape of the pinch at the second extremity of the liner. The slot may for example have a T-shape profile that corresponds to a T-shape pinch on the liner.

According to the invention, the pinch at one extremity of the liner and the connecting part are attached by compression, namely by inserting the pinch in the slot of the connecting part. The compression force at the interface between the pinch and the slot of the connecting part is optimized so that the connecting part and the pinch snap together without deforming the liner during the process according to the invention. This may be achieved by interface optimization between the two parts, i.e. by proper dimensioning and load deformation simulation based on a designed interference between the pinch and the slot.

The compression force can also be generated by pressurization of the molded liner when the pinch is inserted in the slot. Therefore the liner and the connecting part can be put in a mold where by the liner is pressurized forcing it out toward the connecting part, which is constrained by the mold. The step of inserting the pinch in the slot can also further be assisted by performing the operation while the liner is still warm from the molding process.

Preferably an elastomeric seal can be placed between the liner and the connecting part to enhance the sealing properties of the assembly liner/connecting part.

To that end, a groove can be machined into the connecting part so as to accommodate the elastomeric seal that may consist of an O-ring.

Also preferably a ring may be added to the liner that would deform to the contour of the connecting part when the connecting part is connected to the liner. The ring can be positioned outside the pinch area and preferably be molded into the liner with for instance a V-shaped profile so as to ensure deformation in particular when the tank is pressurized.

According to the invention an outer filament winding is applied around the liner and the connecting part once they are assembled. The winding generates a force that could induce the rotation of the connecting part around the extremity of the liner but thanks to the secure connection between the connecting part and the liner, the rotation of the connecting part is prevented.

The filament winding is suitable for containing at least 10 bar of pressure. This can come in the form of a carbon fiber filament composite wound around the outside of the liner, and then, preferably, wound with a layer of a more impact resistant material. Preferably, besides the mechanical constraint of the filament winding on the inner liner, the two are not connected and expand and contract at different rates.

In the method according to the invention, the liner is preferably provided with at least one structural layer and at least one barrier layer and the barrier layer in the liner is preferably sandwiched between two structural layers, as it is the case in conventional fuel tanks. The presence of a barrier layer in the entire liner of the invention further increases its permeation performances. As a consequence, a storage tank with an inner liner as manufactured using this preferred embodiment can be used to reduce the emissions from the storage tanks into the atmosphere. It also allows the storage of gasses of smaller molecule size, as for example hydrogen.

An adhesive layer can be provided between the structural layer and the barrier layer for bonding the two (or 3) layers. The adhesive layer can be made of any material that is adhesive to both the structural layer and the barrier layer, such as for example adhesive modified low-density polyethylene (LDPE) for a PE/EVOH configuration as described below.

Preferably, the structural layer comprises polyethylene (PE) or polyamide (PA).

The barrier layer preferably comprises ethylene vinyl alcohol copolymer (EVOH) and can have a thickness of less than 500 µm, possibly even less than 300 µm.

Further aspects of the invention may become apparent by referring to the detailed description of a preferred embodiment.

The drawings form an integral part of the specification and are to be read in conjunction therewith. The detailed description of the drawings is a non-limiting description of preferred embodiments of the invention.

FIG. 1: is a view of a parison inserted in a mold in an open position.

Figure 2:
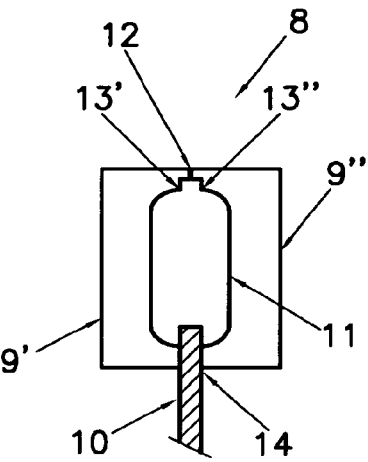
FIG. 2 is a view of the parison in the mold in a closed position.

FIG. 2: is a view of the parison in the mold in a closed position.

Figure 3:
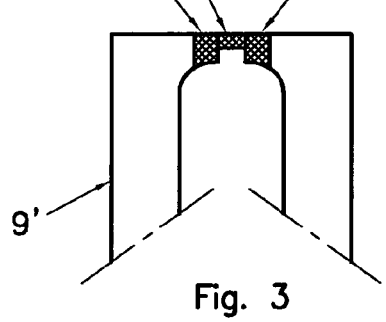
FIG. 3 is a view perpendicular to the view of FIG. 2.

FIG. 3: is a view perpendicular to the view of FIG. 2.

Figure 4:
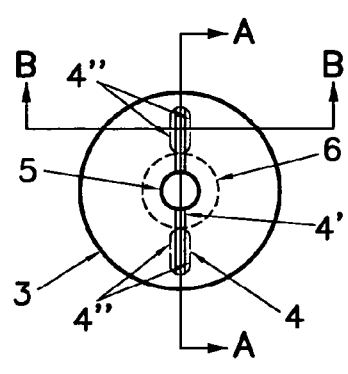
FIG. 4 is a bottom view of a connecting part.

FIG. 4: is a bottom view of a connecting part.

Figure 5:
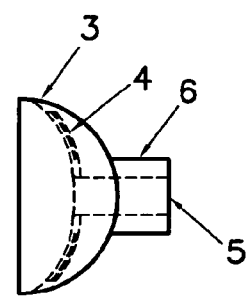
FIG. 5 is a cutaway view through the connecting part along the line A-A.

FIG. 5: is a cutaway view through the connecting part along the line A-A.

Figures 6, 7:
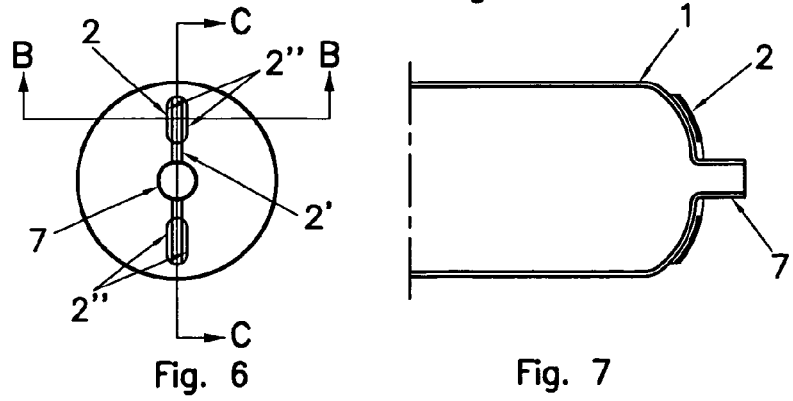
FIG. 6 is a top view of a first end of an inner liner.
FIG. 7 is a cutaway view of the inner liner along the line C-C.

FIG. 6: is a top view of a first end of an inner liner.

FIG. 7: is a cutaway view of the inner liner along the line C-C.

Figure 8:
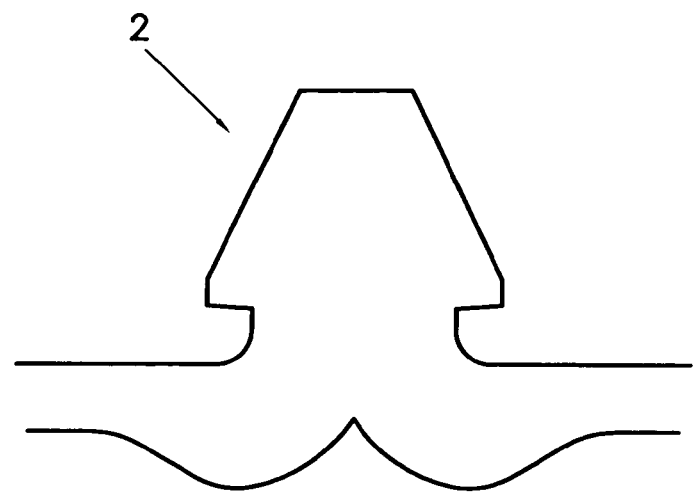
FIG. 8 is a cutaway view of a snap fit pinch.

FIG. 8: is a cutaway view of a snap fit pinch.

Figure 9:
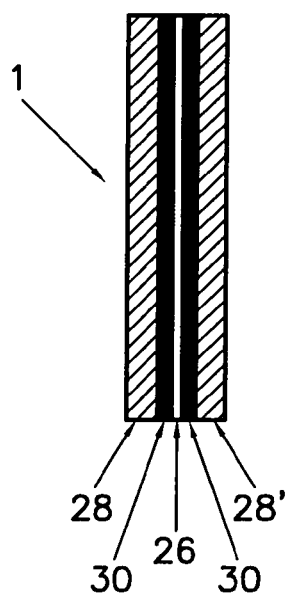
FIG. 9 is a cutaway view through the inner liner according to a first aspect of the invention.

FIG. 9: is a cutaway view through the inner liner according to a first aspect of the invention.

Figure 10:
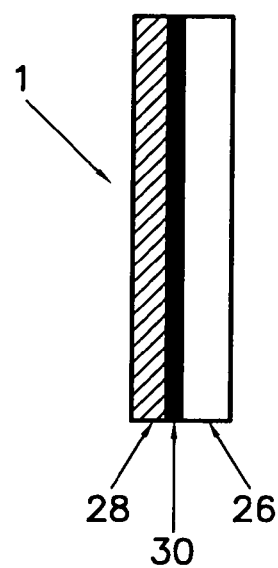
FIG. 10 is a cutaway view through the inner liner according to a second aspect of the invention.

FIG. 10: is a cutaway view through the inner liner according to a second aspect of the invention.

Figure 11:
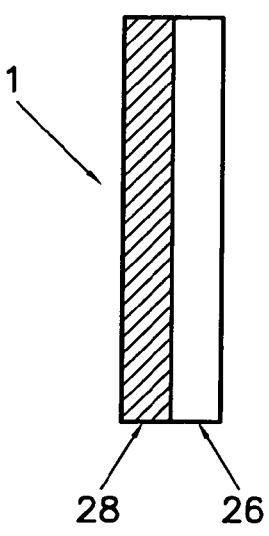
FIG. 11 is a cutaway view through the inner liner according to a third aspect of the invention.

FIG. 11: is a cutaway view through the inner liner according to a third aspect of the invention.

In FIG. 1, a parison 8 made of a polymer and with a closed cross section is extruded and is inserted in between two halves 9' and 9" of a mold in an open position.

In FIG. 2, the mold is closed around the parison 8 and a liner can be blow molded. The shape of the two halves 9' and 9" is defined so as to create a cylindrical housing 11 having the shape of the liner. At the top of the mold, the halves 9' and 9" have parts 13' and 13" that are designed so as to create an extension in the housing 11. At the top of the mold the parison is pinched together (12) and a blowing needle 10 is inserted in the housing 11 at the bottom 14 of the mold which seals around it so that the internal part of the mold is sealed during the molding of the liner.

FIG. 3 illustrates a partial view of the parison 8 in the mold in a plane perpendicular to the view of FIG. 2. The pinch of the parison 8 comprises a part 12 and a part 2 that are created during the blow molding of the liner because the parison 8 has a diameter that is bigger than the diameter of the extension of the housing 11 and because of the limitation in the stretching of the polymer during the blow molding process. The part 12 of the pinch can be removed for instance by machining the end of the extension of the liner after the parison 8 is removed from the mold so as to create an open end at the extremity of the extension of the liner.

Referring to FIG. 4, a bottom view of a connecting part is indicated generally at 3 and has a base and an apex, wherein the apex has a communication opening 5 for forming a communication between the inner chamber of a storage tank and the exterior of the storage tank.

The connecting part 3 comprises a T-shape slot 4 with a groove 4' and lateral extensions 4". The T-shape slot 4 is machined in the connecting part 3 by a T-slot mill or a dovetail type mill and the width of the lateral extensions 4" is determined so as to be bigger than the width of the groove 4'.

The section view of the connecting part 3 shown in FIG. 5 shows the slot 4 and the communication opening 5. The communication opening 5 passes through a tubular extension 6.

FIG. 6 shows a view of one extremity of the inner liner 1 with the part 2 of the pinch and a communication boss 7. As explained above, the part 2 of the pinch is created in the course of the manufacturing process of the liner 1, in particular by blow molding of the parison 8. The part 2 of the pinch presents a first part 2' substantially linear and lateral extensions 2".

The dimensions of the groove 4' and of the lateral extensions 4" are determined so that the part 2' and lateral extensions 2" can be inserted in the slot 4 and that an interference lock can be created between the communicating part 3 and the inner liner 1.

In FIG. 7 is represented the inner liner 1 with the part 2 of the pinch at one extremity of the liner 1 and the communication boss 7. The external diameter of the communication boss 7 is smaller than the diameter of the communication opening 5. The communication opening 5 in the apex of the connecting part 3 cooperates with the communication boss 7 to create a communication passage between the interior of the storage tank and the exterior thereof. A valve (not shown) is generally installed in this communication passage. Through the communication passage, compressed gas can be fed into the storage tank and released therefrom.

FIG. 8 illustrates a profile of a part 2 of the pinch of the snap fit type.

The inner liner 1 shown in FIG. 9 comprises a barrier layer 26 sandwiched between a first and a second structural layer 28, 28' with adhesive layers 30, 30' arranged between the barrier layer 26 and the structural layers 28, 28'. The inner liner 1 shown in FIG. 10 comprises a barrier layer 26 connected to a structural layer 28 via an adhesive layer 30. The inner liner 1 shown in FIG. 11 comprises a barrier layer 26 directly connected to a structural layer 28.

The structural layer 28, 28' can be made of PE and can have a thickness in the range between 1 and 8 mm. Another material that could for example be used for the structural layer is PA. The barrier layer 26 can be made of EVOH and can have a thickness in the range between 50 and 500 µm. The adhesive layer 30, 30' can have a thickness in the range between 50 and 500 µm. The adhesive layer 30, 30' can be made of any material that is adhesive to both the structural layer and the barrier layer, such as for example adhesive modified LDPE for the above PE/EVOH configuration. The overall thickness of the inner liner 1 is in the range between 2 and 17 mm.

While specific embodiments have been shown and described in detail to illustrate the principles of the present invention, it will be understood that the invention may be embodied otherwise without departing from such principles. For example, one skilled in the art will readily recognize from the above discussion and from the accompanying drawings and claims that various changes, modifications and variations can be made without departing from the spirit and scope of the invention as described in the following claims.

The invention claimed is:

1. A method for manufacturing a storage tank, the storage tank comprising an inner liner comprising a shaped pinch, a connecting part having a slot corresponding to the shape of the pinch, and an outer filament winding;
    the method comprising:
    placing an extruded parison between two halves of a mold,
    closing the two halves of the mold thereby compressing the parison at least at one extremity to create a shaped pinch conforming to an internal surface of the two mold halves, wherein the shaped pinch is obtained from the compression of the parison before the parison is blown;
    blowing the parison to conform to the inner surface of the mold to obtain the inner liner;
    providing the connecting part with a slot of appropriate shape and size to receive a part of the shaped pinch;
    inserting the part of the pinch in the slot of the connecting part,
    securing the inner liner and the connecting part to obtain an assembly of the inner liner and connecting part; and
    applying the outer filament winding around the assembly of the inner liner and the connecting part to obtain the storage tank.

2. The method according to claim 1, further comprising: pinching the parison around a blowing needle placed between the two mold halves to seal the parison to the blowing needle.

3. The method according to claim 2, wherein the internal surface of the closed mold halves is a cylindrical housing having an extension at the shaped pinched extremity.

4. The method according to claim 3, wherein the blowing needle is inserted and sealed in a bottom of the cylindrical housing mold and the pinch is formed in a top of the cylindrical housing mold so that the internal part of the mold is sealed during the blow molding of the inner liner.

5. The method according to claim 3, further comprising opening the extension, wherein the connecting part comprises an extension of tubular shape matching the opening of the extension of the housing and the assembly comprises a communication opening from an inner chamber of the storage tank to an exterior.

6. The method according to claim 1, wherein the shape of the shaped pinch is one selected from the group consisting of an inverted cone, a T-shape boss, a stud and a snap fit shape and the slot of the connecting part has a shape that corresponds to the shape of the shaped pinch.

7. The method according to claim 1, wherein the inner liner comprises: at least one structural layer and at least one barrier layer.

8. The method according to claim 7, wherein the inner liner further comprises an adhesive layer which is between the structural layer and the barrier layer.

9. The method according to claim 7, wherein the structural layer comprises polyethylene (PE) or polyamide (PA).

10. The method according to claim 7, wherein the barrier layer comprises ethylene vinyl alcohol copolymer (EVOH).

11. The method according to claim 1, further comprising placing an elastomeric seal between the inner liner and the connecting part.

12. The method according to claim 11, further comprising machining a groove into the connecting part to accommodate the elastomeric seal.

13. The method according to claim 12 wherein the elastic seal is an O-ring.

14. The method according to claim 7, wherein the inner liner comprises two structural layers and one barrier layer and the barrier layer is sandwiched between the structural layers.

15. The method according to claim 14, wherein the barrier layer comprises an ethylene vinyl alcohol copolymer and a thickness of the barrier layer is less than 500 μm.

16. The method according to claim 1, wherein the outer filament winding comprises a carbon fiber filament composite.

17. The method according to claim 16, further comprising winding a layer of impact resistant material over the outer filament.

18. The method according to claim 17, wherein the layer of wound filament and the layer of impact resistant material are not connected and can expand or contract at different rates.

* * * * *